United States Patent [19]
Adams et al.

[11] Patent Number: 5,662,375
[45] Date of Patent: Sep. 2, 1997

[54] MOUNTING CLIP

[75] Inventors: Edward R. Adams, Spring Lake; Bradley D. Miller, Jenison, both of Mich.

[73] Assignee: Donnelly Corporation, Holland, Mich.

[21] Appl. No.: 701,589

[22] Filed: Aug. 22, 1996

Related U.S. Application Data

[63] Continuation of Ser. No. 349,031, Dec. 2, 1994, abandoned.

[51] Int. Cl.$^6$ .............................. B60N 3/02; B60R 13/01
[52] U.S. Cl. ................. 296/214; 248/222.12; 16/110 R; 24/297; 24/607
[58] Field of Search .............................. 349/31; 296/214, 296/71, 39.1; 24/297, 616, 453, 606–607; 248/222.11–222.13, 27.3, 231.81, 231.85; 16/110 R, 114 R, 125, DIG. 40; 49/460; 105/354

[56] References Cited

U.S. PATENT DOCUMENTS

| | | | |
|---|---|---|---|
| 2,803,375 | 8/1957 | Meshberg | 16/110 A |
| 3,176,326 | 4/1965 | Zysman et al. | 16/114 R |
| 3,889,320 | 6/1975 | Koscik | 24/297 |
| 4,191,108 | 3/1980 | Jones | 410/110 |
| 4,517,711 | 5/1985 | Tanaka | 24/453 |
| 4,569,552 | 2/1986 | Marks | 248/189.1 |
| 4,582,443 | 4/1986 | Hegele | 403/9 |
| 4,708,895 | 11/1987 | Mizusawa | 428/31 |
| 4,765,036 | 8/1988 | Iguchi et al. | 24/289 |
| 4,810,147 | 3/1989 | Hirohata | 411/349 |
| 4,874,276 | 10/1989 | Iguchi | 411/48 |
| 4,912,808 | 4/1990 | Blakely | 16/114 R |
| 4,981,323 | 1/1991 | Dowd et al. | 296/214 |
| 5,082,322 | 1/1992 | Cekander et al. | 296/97.9 |
| 5,082,323 | 1/1992 | Dowd et al. | 296/214 |
| 5,314,227 | 5/1994 | Weiland et al. | 296/97.9 |

FOREIGN PATENT DOCUMENTS

| | | |
|---|---|---|
| 676151 | 1/1930 | France ..................... 24/616 |
| 1381705 | 11/1964 | France . |
| 2259273 | 8/1975 | France . |
| 2385931 | 10/1978 | France . |

*Primary Examiner*—Dennis H. Pedder
*Attorney, Agent, or Firm*—Varnum, Riddering, Schmidt & Howlett LLP

[57] ABSTRACT

A mounting clip assembly for mounting an accessory to a roof sheet metal bracket. A mounting clip is fastened to or molded with the accessory and comprises two diverging legs, which are snap-fit into an aperture in the roof sheet metal bracket. A locking bezel has a pair of lugs and a locking finger, which are inserted between the legs to prevent the relative movement of the legs. The locking finger is received within a slot on one of the legs to releasably fasten the bezel to the clip.

25 Claims, 3 Drawing Sheets

1

MOUNTING CLIP

This is a continuation, of application Ser. No. 08/349,031 filed Dec. 2, 1994 now abandoned.

BACKGROUND OF THE INVENTION

1. Field of the Invention

This invention relates to a mounting clip, and, more specifically a mounting clip for mounting automobile accessories to an automobile structure.

2. Description of Related Art

The passenger compartments of contemporary automobiles have a headliner mounted to the sheet metal roof of the passenger compartment. The headliner is typically a foam layer molded with a decorative surface or covered with an outer decorative layer. The headliner can be attached to the vehicle roof by clips which pass through the aligned slots in the headliner and the roof. It is common for the clips which mount the headliner to the roof to also mount automobile accessories to the vehicle. These accessories include: pull grips, garment hooks, light assemblies, mirror assemblies, visors, and visor mounts, for example.

U.S. Pat. No. 5,314,227, issued May 24, 1994, illustrates a clip in combination with a locking bezel for mounting a visor to a vehicle roof. The clip comprises a body from which two opposed arms extend outwardly and downwardly, each arm having a locking flange which is seated behind the upper surface of a sheet metal roof bracket when the clip is inserted through an aperture in the roof bracket. The locking bezel has two locking tongues that extend between the body and the arms and snap-fit within an aperture in the arms to limit the inward deflection of the arms, preventing the removal of the clip, unless the bezel is first removed. A similar clip/bezel combination is shown in U.S. Pat. No. 5,082,323, issued Jan. 21, 1992, except that the locking tongues abut the arms.

U.S. Pat. No. 5,082,322, issued Jan. 21, 1992, discloses a clip for mounting the visor to the vehicle roof. The visor includes a molded-on torque fitting, including a spring clip having triangular flanges with an edge which snaps onto and locks behind a ledge in a header socket positioned above the vehicle roof. A bezel is snap-fit to the molded-on torque fitting and prevents access to the spring clip to prevent removal of the spring clip. Similar clips without a locking flange are shown in U.S. Pat. Nos. 4,708,895, issued Nov. 24, 1987, 4,517,711, issued May 21, 1985, and 4,765,036, issued Aug. 23, 1988.

U.S. Pat. No. 4,569,552, issued Feb. 11, 1986, discloses a clip for mounting a visor to the vehicle roof. The clip includes a torque fitting surrounding the elbow of the visor and a spring clip disposed over the torque fitting. The spring clip has two opposing spring arms which seat behind the upper surface of sheet metal brackets adjacent an aperture upon insertion of the torque fitting into the aperture.

SUMMARY OF INVENTION

The invention is a mounting clip assembly, which is adapted to mount an accessory to a support structure. The mounting clip assembly comprises a mounting clip with first and second legs resiliently joined at one end to define an apex. The legs diverge from the apex and form a gap therebetween at another end. One of the legs has a free end and the other leg is adapted to mount the accessory. Each leg has lips that are adapted to pass through an aperture in the support structure and seat on an upper surface of the support structure to lock the clip to the support structure. The mounting clip assembly further comprises a bezel having a cover and at least one upstanding lug adapted to extend into the gap formed between the legs. The lug prevents the legs from moving toward each other and, thus, the inadvertent removal of the clip from the support structure.

Preferably, one of the legs has a slot formed therein with a bottom surface. The bezel includes a locking finger, which projects upwardly from the cover and has a locking tab that projects laterally behind the bottom surface of the leg slot. The locking finger is resilient and flexes when the lug and the finger are inserted into the gap of the clip. A slanted flat can be formed on the locking finger to engage the bottom surface of the slot so that the bezel can be removed from the clip by pulling the bezel away from the clip.

In one embodiment of the invention, the mounting clip has at least one resilient retaining finger projecting outwardly and downwardly from the side of the first and second legs. The retaining finger is adapted to mount the clip to a headliner. Preferably, the finger is mounted at the apex of the legs. The mounting clip can be integrally molded with the accessory or can be connected to the accessory by a mechanical connector such as a rivet.

In one embodiment of the invention, the mounting clip assembly is adapted to mount an accessory to a headliner with an aperture. The mounting clip assembly comprises a mounting clip with first and second legs, which are adapted to mount the accessory. At least one resilient retaining finger projects outwardly and downwardly from a side of the legs for mounting the clip to the headliner whereby when the clip is inserted into the headliner aperture, the retaining finger is adapted to abut an upper surface of the headliner to mount the clip to the headliner. There can be one or more resilient fingers on different sides of the legs.

In yet another embodiment of the invention, the bezel can be integrally molded with the accessory and the bezel defines an opening which provides access to the mounting clip. The cover is mounted to the bezel by a living hinge. Also, the cover can have at least one snap tab for locking the cover to the bezel.

BRIEF DESCRIPTION OF THE DRAWINGS

The invention will now be described with reference to the drawings wherein.

DESCRIPTION OF THE PREFERRED EMBODIMENTS

Figures 1, 2:
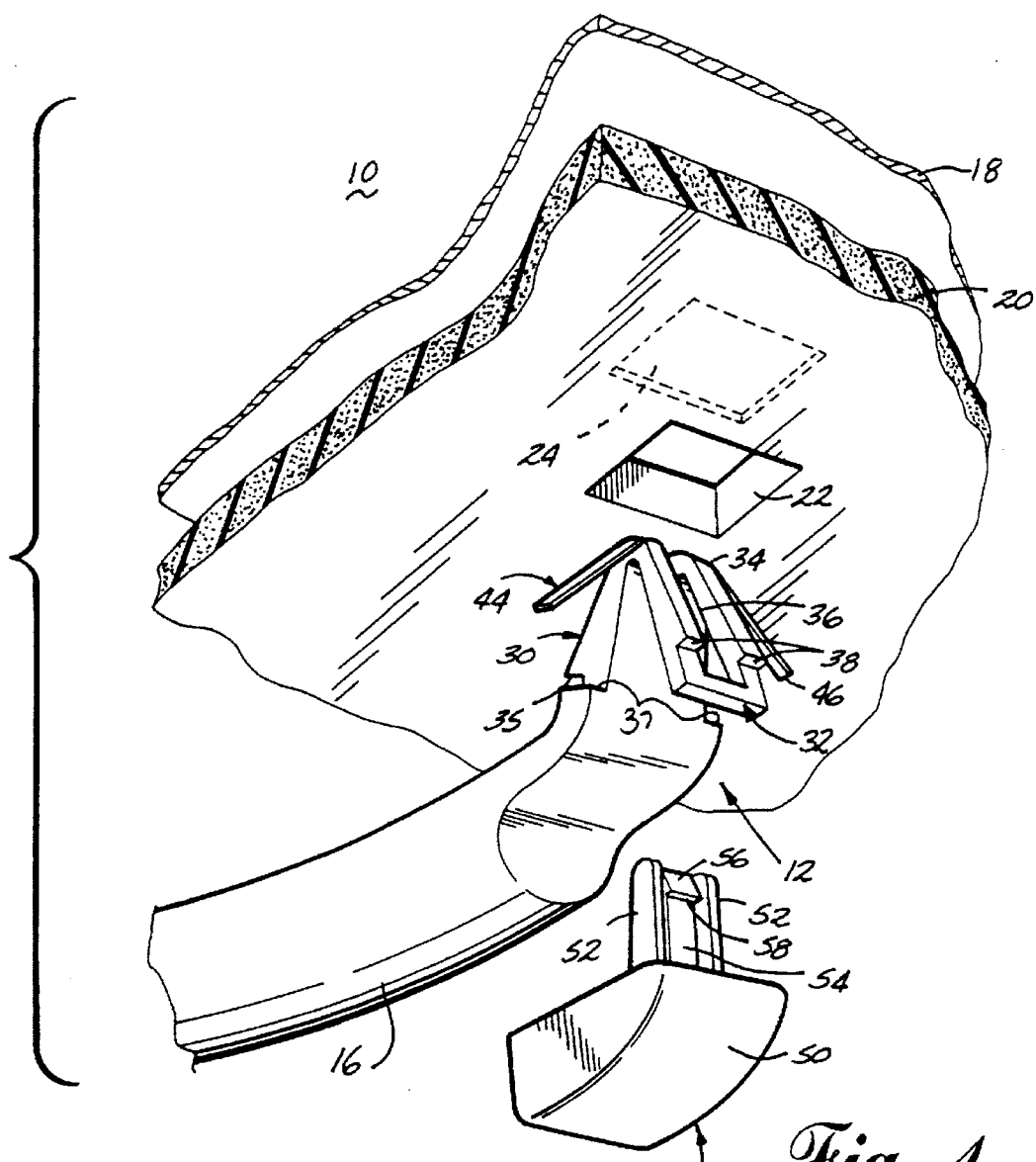
FIG. 1 is a perspective view of a mounting clip assembly according to the invention mounted to a grab handle and a partial view of a vehicle headliner and roof.
FIG. 2 is a partial sectional view of the mounting clip assembly of FIG. 1 mounted to a vehicle headliner and to a roof sheet metal bracket.

Referring now to the drawings, FIG. 1 illustrates a mounting clip assembly 10 in accordance with the invention. For illustration purposes, the mounting clip assembly 10 is shown in the context of mounting a vehicle accessory to a vehicle. However, the mounting clip assembly 10 can be used in a variety of different applications other than for mounting accessories to an automotive vehicle.

Mounting clip assembly 10 is shown mounting a vehicle accessory, such as grab handle 16, to a roof sheet metal bracket 18. The mounting clip assembly 10 comprises a mounting clip 12 in combination with a locking bezel 14, which prevents the inadvertent removal of the mounting clip 12 from the vehicle roof. A vehicle headliner 20 is positioned against the roof sheet metal bracket 18. In the grab handle 16 application, the mounting clip 12 is affixed to the end of the grab handle 16. To mount the grab handle 16 to the roof sheet metal bracket 18, the mounting clip 12 is inserted through aligned apertures 22 and 24 in the headliner 20 and bracket 18, respectively, and the clip 12 is shaped to prevent the direct removal of the clip from the aligned apertures and thereby secures the grab handle 16 to the roof sheet metal bracket 18.

The mounting clip 12 is substantially V-shaped in profile and comprises a first leg 30 and a second leg 32, which meet at an apex 34. The first leg 30 extends from the grab handle 16 to the apex 34 and has intermediate the length thereof a lip 35, which snaps behind the upper surface of the bracket 18 when the grab handle 16 is mounted to the bracket 18. The second leg 32, unlike the first leg 30, can have a centrally disposed slot extending substantially the length of the first leg. Like the first leg 30, the second leg 32 has intermediate the length thereof a lip 38, which snaps into and seats behind the upper surface of the roof sheet metal bracket 18 when the grab handle is mounted to the bracket 18. The lip 38 is shown as being discontinuous because of the slot 36. Depending on the length of the slot 36, the lip 38 may or may not be discontinuous. The legs 30 and 32 are preferably both resilient so that the legs can flex toward each other about the apex 34 when the legs are inserted into the bracket aperture 24 and exert a resilient force against the aperture with the lips 35 and 38 firmly seated on the upper surface of the bracket 18 to lock the clip 12 to the bracket 18 with the headliner therebetween. Each of the first and second legs has a first side facing the other leg, a second side facing away from the other leg, a third side joining the first and second sides and a fourth side opposite the third side and joining the first and second sides. A pair of stop surfaces 37 extend from the third and fourth sides of the first leg 30 and a stop surface 39 extends laterally beneath the lip 35 and above the grab handle to abut the bottom surface of the roof sheet metal bracket 18 and thereby arrest the upward movement of the mounting clip legs 30 and 32 in the aperture 24 as the legs 30 and 32 are inserted into the apertures 24 during installation of the mounting clip.

A pair of retaining fingers 44, 46 extend outwardly and downwardly from the third and fourth sides of the legs 30 and 32 at apex 34. The retaining fingers 44, 46 are relatively thin, especially when compared to the legs 30 and 32. Preferably, the retaining fingers 44, 46 are longer than the distance from the apex 34 to the lips 35 or 38 so that the retaining fingers are retained against the third and fourth sides of the legs 30 and 32 upon the insertion of the clip 12 into the roof bracket aperture 24. The retaining fingers 44 and 46 are resilient and are normally biased outwardly at an acute angle up to 90° with respect to legs 30 and 32. Also, the clip 12, including retaining fingers 44 and 46, is preferably injection molded as a single piece from a resilient plastic material. Alternatively, the clip can be shaped from a resilient metal such as spring steel.

The locking bezel 14 comprises a decorative cover 50, which hides the mounting clip 12 from view when the locking bezel 14 is secured to the mounting clip 12. As illustrated, the decorative cover 50 has a shape conforming to the contour of the grab handle 16. However, the decorative cover 50 can have any shape depending on the particular application. A pair of spaced locking lugs 52 extend from the inner surface of the decorative cover 50. The locking lug 52 is sized to fit between the legs 30, 32 to prevent them from flexing inwardly toward each other. A single locking lug 52 can be used instead of two locking lugs.

A resilient locking finger 54 is disposed between the spaced locking lugs 52 and extends upwardly from the inner surface of the cover 50 and has a locking tab 56 at an outer end thereof. The locking finger 54 is sized so that it can be flexed inwardly and be received within the slot 36 of the second leg 32. A flat 58 is formed on the locking tab 56 and seats above the lower surface of the clip slot 36. The flat is angled such that the locking finger 54 can be separated from the slot 36 by pulling on the cover 50 with sufficient force. Thus, the finger 54 resiliently retains the locking bezel 14 in locking relationship to the mounting clip 12.

Referring to FIGS. 1 and 2, the grab handle 16 is mounted to the roof sheet metal bracket 18 (or to the vehicle rail sheet metal) by first inserting the mounting clip 12 into the headliner aperture 22 and roof bracket aperture 24. As the mounting clip 12 is inserted, the second leg 32 is flexed inwardly with respect to the first leg. Although the first leg 30 is made from resilient material like the second leg 32, the first leg 30 tends to be more rigid than the second leg because it is thicker than the apex 34.

The retaining fingers 44, 46 are used to mount the clip 12 (and the grab handle 16) to the headliner prior to assembly of the headliner 20 to the vehicle. Thus, various accessories can be assembled to the headliner before:the headliner is positioned in the vehicle. The clip 12 is inserted into the aperture 22 of the headliner 20 so that the retaining fingers 44, 46 spring behind the headliner 20 as illustrated in FIG. 2. The retaining fingers 44, 46 are relatively light and will not damage the headliner 20 during shipment or assembly. When the headliner 20 is positioned in the vehicle, the clips 12, already properly positioned in the headliner 20 for insertion into the aperture 24, are pushed into place through the apertures 24.

Figure 3:
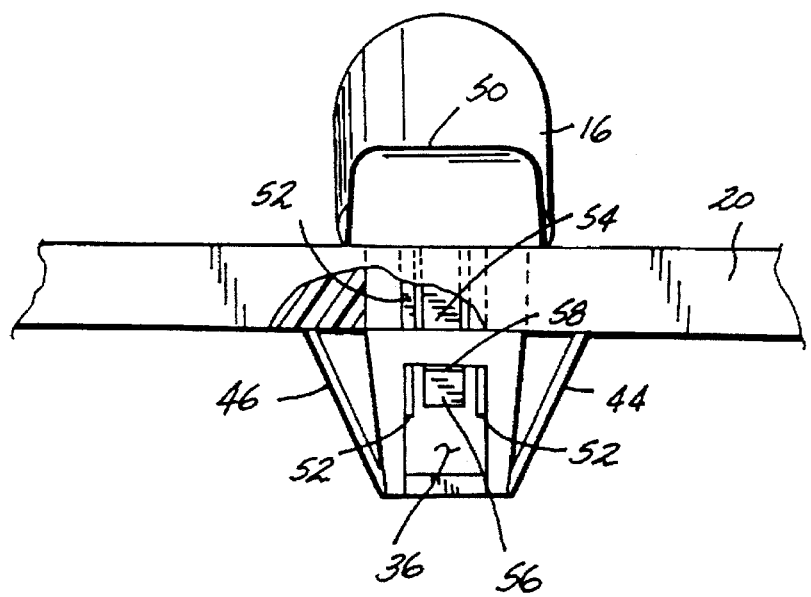
FIG. 3 is an end view of the mounting clip assembly of FIG. 1 assembled to a vehicle headliner.

For example, referring to FIG. 3, therein it is illustrated the grab handle 16 of FIG. 1 mounted to the headliner 20 prior to the assembly of the grab handle 16 and headliner 20 the roof sheet metal bracket 18. In the preassembled position, the mounting clip 12 is inserted into the headliner aperture 22 of the headliner 20 a sufficient distant so that the retaining fingers 44 and 46 are biased outwardly by their inherent resiliency and abut the upper surface of the headliner 20 to secure the grab handle 16 to the headliner without relying on the first leg 30 and second leg 32 of the mounting clip. In this manner, the vehicle accessory, such as the grab handle 16, can be mounted to the vehicle headliner so that the headliner and its vehicle accessories can be shipped and installed as a single unit.

Once the lips 35 and 38 are inserted beyond the roof sheet metal bracket 18, the inherent resiliency of the first leg 30 and second leg 32 biases the legs 30, 32 outwardly to position the lips 35 and 38 above the roof sheet metal bracket 18 adjacent the roof bracket aperture 24. In this position, the lips 34, 36 lock the mounting clip 12 to the bracket. To remove the mounting clip 12, the legs 30, 32 can be squeezed together to position the lips 35, 38 within the perimeter of the roof bracket aperture 24.

The locking bezel 14 is snap-fit to the mounting clip 12 to prevent the inadvertent or unauthorized removal of the mounting clip 12. The locking lugs 52 prevent the first leg 30 and the second leg 32 from being squeezed together while the cover 50 simultaneously performs the function of hiding from view the first leg 30 and second leg 32. To mount the locking bezel 14, the locking bezel 14 is oriented so that the lugs 52 are positioned between the first leg 30 and second leg 32 and the locking finger 54 is aligned with the slot 36 of the mounting clip 12. The locking bezel 14 is then pressed upwardly to insert the locking finger 54 and locking tab 56 within the slot 36. As the locking bezel 14 is moved upwardly, the locking lug 52 abuts the first and second legs 30, 32 to prevent the inward movement of the second leg 32 with respect to leg 30. The locking finger 54 and tab 56 are completely received within the slot 36 to hold the bezel into locking relationship with the clip 12 with the locking tab flat 58 in abutting relationship with the lower surface of the slot 36.

Figure 4:
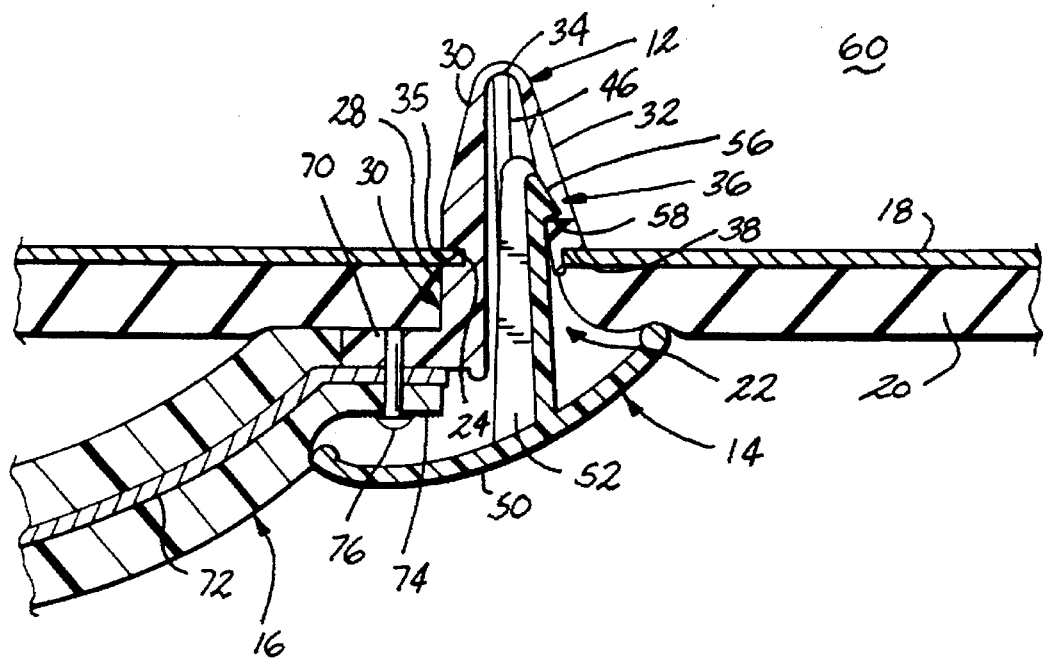
FIG. 4 is a sectional view like FIG. 2 of an assembled mounting clip assembly of a second embodiment shown attached to a vehicle roof and to a vehicle headliner.

Referring to FIG. 4, there is illustrated a second embodiment of the mounting clip assembly according to the invention. The second embodiment of the mounting clip assembly is illustrated in the same context of a passenger compartment of an automobile. The second embodiment is similar to the first embodiment except that the clip is mechanically fastened to the grab handle instead of being integrally molded therewith. Like numerals are used to identify like parts.

In the second embodiment, the mounting clip assembly 10 is substantially the same as the first embodiment except that the first leg 30 has a base 70 extending substantially perpendicular to the first leg.

The grab handle 16 is similar to the first embodiment except that it has a metal strip 72 molded within and extending from the end of the grab handle 16 and the grab handle 16 has a molded extension 74. The metal strip 72 overlies the molded extension 74. The mounting clip 12 is secured to the grab handle 16 by positioning the base 70 against the metal strip 72 and passing a fastener 76 through grab handle extension 74 and base 72. Once the clip 12 is fastened to the handle 16, the clip is installed in the same manner as described for the first embodiment.

Figure 5:
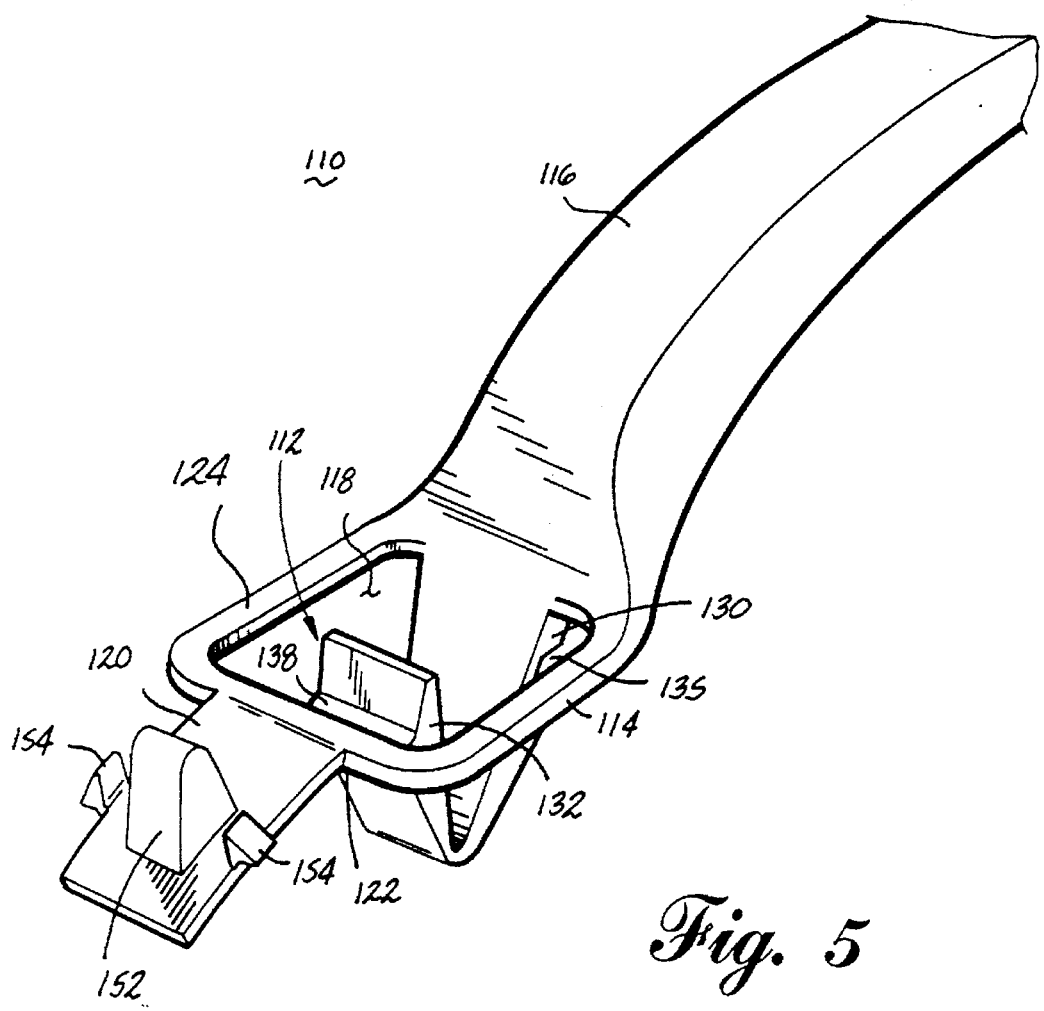
FIG. 5 is a perspective view of a third embodiment of the mounting clip assembly according to the invention.
Figure 6:
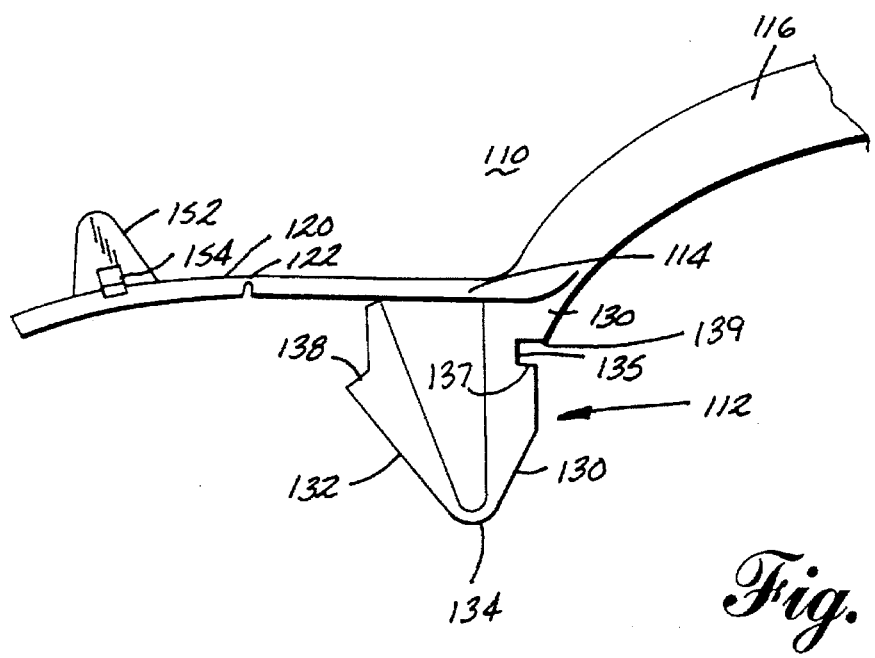
FIG. 6 is a side view of the mounting clip assembly of FIG. 5.

Referring to FIGS. 5 and 6, a mounting clip assembly 110 is illustrated in the context of a grab handle 116. However, it is understood that the mounting clip assembly 110 can be used to mount a variety of accessories to a roof sheet metal bracket and the vehicle headliner of the type as previously illustrated in FIGS. 1-4.

The mounting clip assembly 110 comprises a mounting clip 112 integrally molded with the grab handle 116. Unlike the previously described grab handles, the grab handle 116 has an integrally molded bezel 114 which through a peripheral flange 124 defines an opening 118. A cover 120 is connected to a portion of the bezel 114 by a living hinge 122, whereby the cover can be rotated between a first position where the cover substantially closes the opening 118 and a second position where the cover 120 is displaced from the opening 118.

The mounting clip 112 is substantially V-shaped in profile and comprises a first leg 130 and a second leg 132, which meet at an apex 134. The first leg extends from the grab handle 116 to the apex 134 and has a groove 135 that snaps behind the upper surface of a roof sheet metal bracket when the grab handle 116 is mounted to the bracket. The second leg 132 has a lip 138 that snaps into and seats behind the upper surface of a roof sheet metal bracket when the grab handle is mounted to the bracket. The groove 135 in the first leg 130 includes an upper surface 139 that is adapted to rest against the upper surface of the roof sheet metal bracket and lower stop surface 137 that is adapted to abut a lower surface of the sheet metal bracket and thereby arrest upward movement of the legs 130 and 132 into the roof sheet metal bracket aperture (e.g.,aperture 24 in FIGS. 1 and 2) as the legs 130 and 132 are inserted into the bracket aperture during installation of the mounting clip.

The cover 120 comprises a locking lug 152 positioned in a central portion of the cover 120. Preferably, the locking lug is positioned on the cover 120 so that when the cover is moved to the first position, the lug 152 is positioned between the first leg 130 and the second leg 132 to prevent relative movement of the legs towards each other. The cover 120 also comprises resilient spring tabs 154 positioned at the periphery of the cover 120. The spring tabs are triangle-shaped in cross section and extend beyond the periphery of the cover to snap fit behind the peripheral flange 124 when the cover is in the first position to the lock the cover 120 to the bezel 114.

The mounting clip assembly 110 and its associated accessory, grab handle 116, are mounted to a vehicle in substantially the same manner as described above with respect to the first and second embodiments. Specifically, the mounting clip 112 is inserted into an aperture in the roof sheet metal bracket until the edge of the roof sheet metal bracket defining the aperture is received within the groove 135 of the first leg 130 and the lip 138 of the second leg 132 is seated against the upper surface of the roof sheet metal bracket. In this position, the clip 112 is secured to the roof sheet metal bracket. However, the clip 112 can be removed by moving the second leg 132 toward the first leg 130 until the clip 138 is unseated from the upper surface of the roof sheet metal bracket. To prevent such movement, the cover 120 is rotated about the living hinge 122 to insert the locking lug 152 between the first and second legs 130, 132. The cover 120 is pressed toward the legs 130, 132 until the spring tabs snap in place with respect to the bezel 114 to secure the cover 120 to the bezel and close the opening 118.

The V-shape construction of the invention advantageously provides a clip that is lockable with a bezel having only a single locking lug. The single locking lug prevents the movement of both legs along with positioning the bezel. The combination of the V-shaped clip and the single locking lug is a significant simplification over the prior art and a reduction in the relative cost and manufacturing complexity.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A mounting clip assembly adapted to mount an accessory to a support structure, the mounting clip assembly comprising:

a mounting clip comprising:
first and second legs resiliently joined at one end to define an apex, the legs diverging from the apex to form a gap between the legs at another end thereof;
one of the first and second legs having a free end and the other of the first and second legs mounted to the accessory;
each of the first and second legs having intermediate the length thereof a lip adapted to pass through an aperture in the support structure upon resilient deflection of the first and second legs toward each other and seat on an upper surface of the support structure to retain the clip in the support structure aperture;

least one stop surface between the lips of the other leg and the accessory and adapted to abut a lower surface of the support structure to arrest movement of the mounting clip legs into the aperture support structure as the first and second legs are inserted into the aperture; and a bezel having a cover and at least one upstanding lug adapted to extend into the gap between the first and second legs to prevent the legs from moving toward each other and, thus, the inadvertent removal of the clip from the support structure aperture.

2. A mounting clip assembly according to claim 1 wherein one of the first and second legs has a slot with a bottom surface, and the bezel further comprising a locking finger, separate from the upstanding lug, projecting upwardly from the cover and having a locking tab that projects laterally behind the bottom surface of the leg slot.

3. A mounting clip assembly according to claim 2 wherein the locking finger is resilient to flex when the lug and the finger are inserted into the gap of the clip.

4. A mounting clip assembly according to claim 3 wherein the locking finger has a slanted flat, which engages the bottom surface of the slot, to facilitate removal of the bezel from the clip when the bezel is pulled away from the clip.

5. A mounting clip assembly according to claim 1 wherein the clip has at least one resilient retaining finger that projects laterally outwardly and downwardly from a side of the first and second legs and is adapted to mount the clip to a headliner.

6. A mounting clip assembly according to claim 5 wherein there are two retaining fingers, one on each of the sides of the first and second legs.

7. A mounting clip assembly according to claim 6 wherein the resilient fingers are mounted at the apex of the legs.

8. A mounting clip assembly according to claim 1 wherein the clip is integrally molded in one piece with an accessory.

9. A mounting clip assembly according to claim 1 wherein the clip is connected to an accessory by a mechanical connector.

10. A mounting clip assembly according to claim 9 wherein the mechanical connector is a rivet.

11. A mounting clip assembly according to claim 1 wherein the bezel is integrally molded to an accessory and through a peripheral flange defines an opening providing access to the mounting clip.

12. A mounting clip assembly according to claim 11 further comprising a living hinge mounting the cover to the peripheral flange of the bezel for moving the cover between a first position where it closes the opening and a second position displaced from the opening.

13. A mounting clip assembly according to claim 12 wherein the cover further comprises at least one tab at the periphery of the cover to snap behind the peripheral flange to lock the cover to the bezel.

14. An accessory mounting comprising:

a structural support with an upper and lower surface and at least one aperture extending through the structural support;

an accessory;

a mounting clip comprising:

first and second legs resiliently joined at one end to define an apex, the legs diverging from the apex to form a gap between the legs at another end thereof;

one of the first and second legs having a free end and the other of the first and second legs mounted to the accessory, each of the first and second legs having intermediate the length thereof a lip adapted to pass through the support structure aperture upon resilient deflection of at least one of the first and second legs, each lip being seated on the upper surface of the support structure to retain the clip in the support structure aperture;

at least one stop surface between the lips of the other leg and the accessory and abutting the lower surface of the structural support to prevent further movement of the mounting clip legs into the structural support aperture; and a bezel having a cover and at least one upstanding lug extending into the gap between the first and second legs to prevent the legs from moving toward each other and, thus, the inadvertent removal of the clip from the support structure.

15. An accessory mounting according to claim 14 wherein one of the first and second legs has a slot with a bottom surface, and the bezel further comprising a locking finger, separate from said lug, projecting upwardly from the cover and having a locking tab that projects laterally behind the bottom surface of the leg slot.

16. An accessory mounting according to claim 15 wherein the locking finger is resilient to flex when the lug and the finger are inserted into the gap of the clip.

17. An accessory mounting according to claim 16 wherein the locking finger has a slanted flat to facilitate removal of the bezel from the clip when the bezel is pulled away from the clip.

18. A mounting clip assembly according to claim 14 wherein the clip has at least one relatively thin retaining finger that extends downwardly from a side of the first and second legs, and is retained against at least one of the first and second legs by the structural support but is adapted to spring laterally outwardly of said first and second legs to mount the clip to a headliner in the absence of the structural support.

19. An accessory mounting according to claim 18 wherein there are two retaining fingers, one on each of the sides of the first and second legs.

20. An accessory mounting according to claim 19 wherein the resilient fingers are mounted at the apex of the legs.

21. A mounting clip assembly adapted to mount an accessory to a headliner with an aperture, the mounting clip assembly comprising:

a mounting clip having first and second legs resiliently joined at one end to define an apex, the legs diverging downwardly from the apex at an acute angle to form a gap between the legs at another end thereof;

each of said legs having a first side facing the other of said legs, a second side facing away from the other of said legs, a third side joining the first and second sides and a fourth side opposite the third side and joining the first and second sides;

at least one of the first and second legs having a lip adapted to pass through a support aperture upon flexure of said at least one leg and seat on an upper surface of a support structure to retain the mounting clip in the support structure aperture; and a first resilient retaining finger that is relatively thin with respect to a thickness of the legs and which projects laterally and downwardly from an upper portion of said third side of at least one of said first and second legs to a free end, the first resilient retaining finger adapted to flex inwardly adjacent the third side of said at least one leg when said first and second legs are inserted through the aperture in the headliner and spring outwardly therefrom behind the headliner when the first resilient finger passes through the aperture in the headliner with the free end of the retaining finger abutting an upper surface of the headliner a spaced distance from the aperture when the clip is inserted into the headliner aperture to thereby mount the clip to the headliner.

22. A mounting clip according to claim 21 and further comprising a second resilient retaining finger that is relatively thin with respect to the thickness of the legs of a length substantially equal to the first resilient retaining finger and projecting laterally and downwardly of an upper portion of said fourth side of at least one of said first and second legs to a free end which is adapted to abut the upper surface of the headliner a spaced distance from the aperture to further retain the mounting clip to the headliner.

23. A mounting clip assembly according to claim 22 wherein the first and second resilient retaining fingers extend from opposite sides of the apex of the first and second legs.

24. A headliner and accessory assembly comprising:

a headliner having an aperture therethrough;

an accessory mounted to a mounting clip having first and second legs resiliently joined at one end to define an apex, the legs diverging downwardly from the apex at an acute angle to form a gap between the legs at another end thereof;

each of the first and second legs having a first side facing the other of said legs, a second side facing away from the other of said legs, a third side joining the first and second sides and a fourth side opposite the third side and joining the first and second sides;

at least one of the first and second legs having a lip adapted to pass through an aperture in a support upon flexure of said at least one leg and seat on an upper surface of a support structure to retain the mounting clip in the support structure aperture; and a first resilient retaining finger that is relatively thin with respect to a thickness of the legs and projecting laterally and downwardly from an upper portion of the third side of at least one of the first and second legs to a free end which bears against an upper surface of the headliner a spaced distance from the headliner aperture to retain the clip in the headliner aperture and thereby retain the accessory mounting to the headliner.

25. A headliner and accessory assembly according to claim 24 and further comprising a second resilient retaining finger that is relatively thin with respect to the thickness of the legs and is of a length substantially equal to the first resilient retaining finger, said second resilient retaining finger projecting laterally and downwardly from an upper portion of said fourth side of at least one of the first and second legs, the second resilient retaining finger having a free end which abuts the upper surface of the headliner a spaced distance from the headliner aperture to further assist in retaining the mounting clip in the aperture of the headliner.

* * * * *